United States Patent
Harsany et al.

(10) Patent No.: US 11,989,567 B2
(45) Date of Patent: May 21, 2024

(54) AUTOMATIC SYSTEMS DEVICES REDISCOVERY

(71) Applicant: Lenovo Global Technology (United States) Inc., Morrisville, NC (US)

(72) Inventors: John Scott Harsany, Cypress, TX (US); Fred Allison Bower, III, Durham, NC (US); Ming Lei, Shanghai (CN)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 209 days.

(21) Appl. No.: 17/703,673

(22) Filed: Mar. 24, 2022

(65) Prior Publication Data

US 2023/0305859 A1  Sep. 28, 2023

(51) Int. Cl.
   *G06F 9/445* (2018.01)
   *G06F 9/44* (2018.01)
   *G06F 9/4401* (2018.01)

(52) U.S. Cl.
   CPC ........ *G06F 9/44505* (2013.01); *G06F 9/4403* (2013.01)

(58) Field of Classification Search
   CPC .......................... G06F 9/4403; G06F 9/44505
   See application file for complete search history.

(56) References Cited

U.S. PATENT DOCUMENTS

| | | | | |
|---|---|---|---|---|
| 7,689,786 B1 * | 3/2010 | Riordan | .................. | G06F 3/067 712/216 |
| 9,542,195 B1 * | 1/2017 | Astarabadi | .......... | G06F 11/1469 |
| 2002/0169918 A1 * | 11/2002 | Piatetsky | ............ | G06F 13/4081 710/302 |
| 2004/0268113 A1 * | 12/2004 | Rothman | .............. | H04L 41/084 713/2 |
| 2005/0120340 A1 * | 6/2005 | Skazinski | ................. | G06F 8/20 717/140 |
| 2006/0031598 A1 * | 2/2006 | Blanchard | ............. | G06F 9/4411 710/15 |
| 2006/0168208 A1 * | 7/2006 | Nagami | .................. | H04L 43/00 709/224 |
| 2008/0235524 A1 * | 9/2008 | Sharma | ............... | G06F 11/0793 713/300 |
| 2013/0132614 A1 * | 5/2013 | Bajpai | ..................... | G06F 8/654 710/10 |
| 2019/0104024 A1 * | 4/2019 | Biran | .................. | H04L 41/0677 |
| 2019/0384642 A1 * | 12/2019 | Bolkhovitin | ........... | G06F 3/067 |
| 2020/0042391 A1 * | 2/2020 | Pepper | ................ | G06F 11/1417 |
| 2020/0218545 A1 * | 7/2020 | Ganesan | ............... | G06F 9/4411 |
| 2020/0295965 A1 * | 9/2020 | Lemieux | .............. | B60Q 1/2611 |
| 2021/0208901 A1 * | 7/2021 | Banik | .................. | G06F 9/4411 |
| 2022/0291730 A1 * | 9/2022 | Desai | .................... | G06F 1/3296 |
| 2023/0396504 A1 * | 12/2023 | Madegowda | ....... | H04L 41/0816 |

* cited by examiner

*Primary Examiner* — Jaweed A Abbaszadeh
*Assistant Examiner* — Cheri L Harrington
(74) *Attorney, Agent, or Firm* — Kunzler Bean & Adamson; Bruce R. Needham

(57) ABSTRACT

A method for automatic systems devices rediscovery includes creating a hardware map of hardware components of a computing system at a time when each of the hardware components of the computing system is discoverable. The method includes determining discoverability of each hardware component in the hardware map at a point in time after creation of the hardware map, and in response to determining that a hardware component listed in the hardware map is not discoverable, initiating a reset of the hardware component.

15 Claims, 5 Drawing Sheets ial storage devices. Where a module or portions of a module are implemented in software, the software portions are stored on one or more computer readable storage devices.

AUTOMATIC SYSTEMS DEVICES REDISCOVERY

FIELD

The subject matter disclosed herein relates to discoverability of hardware components and more particularly relates to automatic reset of one or more hardware components after determining that a hardware component is not discoverable.

BACKGROUND

System firmware in baseboard management controllers ("BMCs") and firmware compliant with a unified extensible firmware interface ("UEFI") specification are responsible to discover hardware components of a computing system. Intermittent issues sometimes cause a hardware component to not be discoverable. Often there is not an alert about a non-discoverable hardware device which is often discovered by a user or in some situation when the hardware component is depended upon for some task.

BRIEF SUMMARY

A method for automatic systems devices rediscovery is disclosed. An apparatus and computer program product also perform the functions of the method. The method includes creating a hardware map of hardware components of a computing system at a time when each of the hardware components of the computing system is discoverable. The method includes determining discoverability of each hardware component in the hardware map at a point in time after creation of the hardware map, and in response to determining that a hardware component listed in the hardware map is not discoverable, initiating a reset of the hardware component.

An apparatus for automatic systems devices rediscovery includes a processor and a memory storing code. The code is executable by the processor to perform operations that include creating a hardware map of hardware components of a computing system at a time when each of the hardware components of the computing system is discoverable, determining discoverability of each hardware component in the hardware map at a point in time after creation of the hardware map, and in response to determining that a hardware component listed in the hardware map is not discoverable, initiating a reset of the hardware component.

A program product for automatic systems devices rediscovery includes a non-volatile computer readable storage medium storing code. The code is configured to be executable by a processor to perform operations that include creating a hardware map of hardware components of a computing system at a time when each of the hardware components of the computing system is discoverable, determining discoverability of each hardware component in the hardware map at a point in time after creation of the hardware map, and in response to determining that a hardware component listed in the hardware map is not discoverable, initiating a reset of the hardware component.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
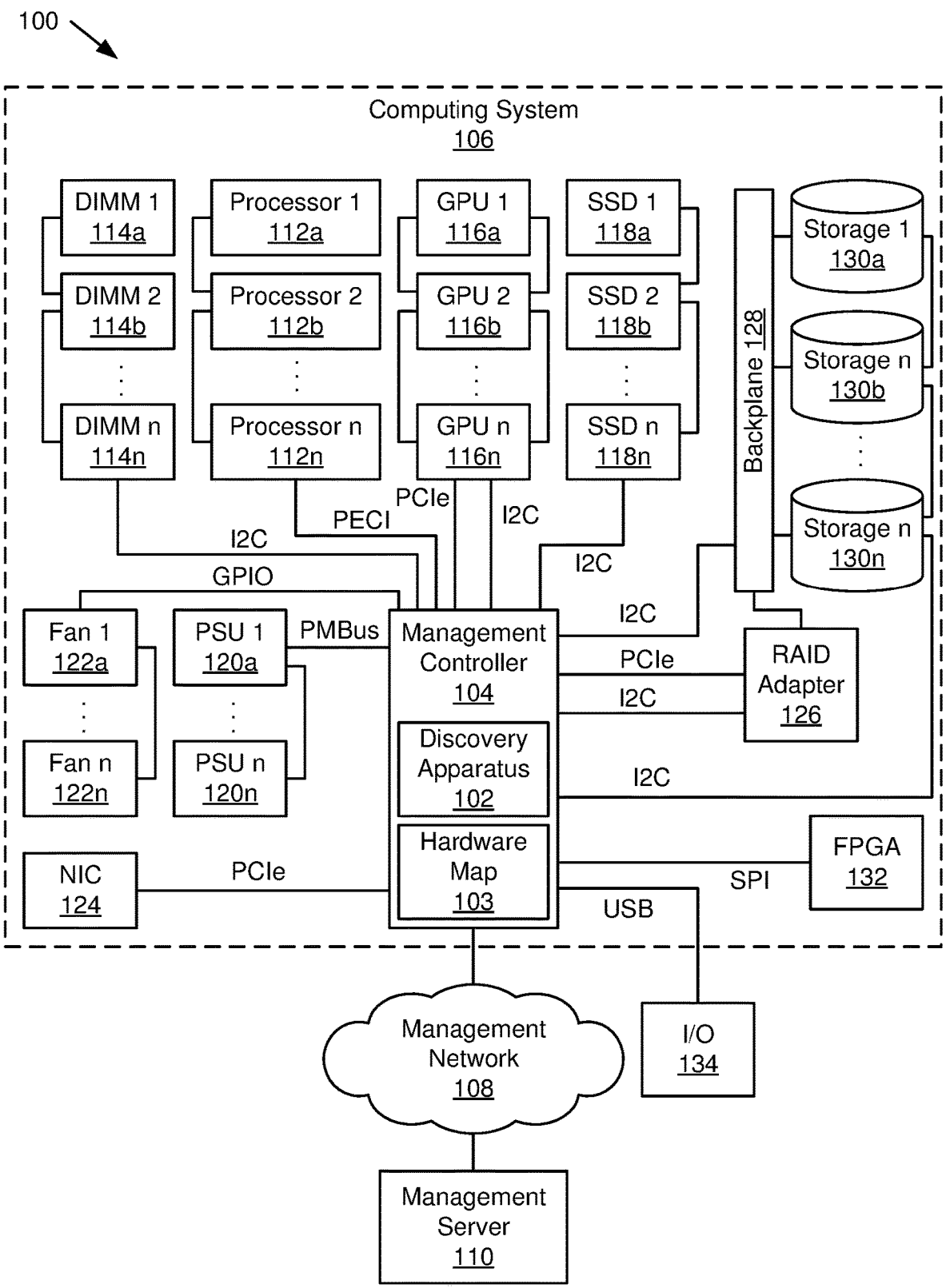
FIG. 1 is a schematic block diagram illustrating a system for automatic systems devices rediscovery, according to various embodiments.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission. The storage devices, in some embodiments, do not embody signals.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory (ROM), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A method for automatic systems devices rediscovery is disclosed. An apparatus and computer program product also perform the functions of the method. The method includes creating a hardware map of hardware components of a computing system at a time when each of the hardware components of the computing system is discoverable. The method includes determining discoverability of each hardware component in the hardware map at a point in time after creation of the hardware map, and in response to determining that a hardware component listed in the hardware map is not discoverable, initiating a reset of the hardware component.

In some embodiments, the method includes determining if the hardware component is discoverable after the reset, initiating a normal operating mode in response to determining that the hardware component is discoverable, and sending an alert to a system administrator in response to determining that the hardware component is not discoverable. In other embodiments, the method includes prior to sending the alert, repeating resetting the hardware component that is not discoverable and determining if the hardware component is discoverable, incrementing a reset counter each time the hardware component is determined to be not discoverable after a reset, and sending the alert in response to the reset counter reaching a reset threshold.

In other embodiments, the method includes initiating a reset of an upstream hardware component located upstream of the hardware component that is not discoverable after a reset of the hardware component that is not discoverable and prior to sending the alert. In the embodiments, the method includes determining if the hardware component is discoverable in response to the reset of the upstream hardware component. The alert is sent in response to determining that the hardware component is not discoverable after the reset of the upstream hardware component.

In some embodiments, determining discoverability of each hardware component in the hardware map is in response to a startup event. In other embodiments, the startup event is a return to operation after a sleep mode, a return to operation after a soft start, or a return to operation after a full reset. In other embodiments, determining discoverability of each hardware component in the hardware map occurs during a normal operating mode. In further embodiments, initiating the reset of the hardware component, upstream hardware components, and/or a full reset is in response to preparing operation of the computing system for a reset.

In some embodiments, the computing system is controlled via a baseboard management controller ("BMC"), and creating the hardware map, determining discoverability of the hardware components of the computing system and initiating a reset of the hardware component that is not discoverable are controlled by the BMC. In other embodiments, creation of the hardware map is triggered by a system administrator, in response to addition of a hardware component to the computing system, and/or in response to removal of a hardware component to the computing system.

An apparatus for automatic systems devices rediscovery includes a processor and a non-volatile memory storing code. The code is executable by the processor to perform operations that include creating a hardware map of hardware components of a computing system at a time when each of the hardware components of the computing system is discoverable, determining discoverability of each hardware component in the hardware map at a point in time after creation of the hardware map, and in response to determining that a hardware component listed in the hardware map is not discoverable, initiating a reset of the hardware component.

In some embodiments, the operations further include determining if the hardware component is discoverable after the reset, initiating a normal operating mode in response to determining that the hardware component is discoverable, and sending an alert to a system administrator in response to determining that the hardware component is not discoverable. In further embodiments, the operations include, prior to sending the alert, repeating resetting the hardware component that is not discoverable and determining if the hardware component is discoverable, incrementing a reset counter each time the hardware component is determined to be not discoverable after a reset, and sending the alert in response to the reset counter reaching a reset threshold.

In other embodiments, the operations further include initiating a reset of an upstream hardware component located upstream of the hardware component that is not discoverable after a reset of the hardware component that is not discoverable and prior to sending the alert. In the embodiments, the operations further include determining if the hardware component is discoverable in response to the reset of the upstream hardware component. The alert is sent in response to determining that the hardware component is not discoverable after the reset of the upstream hardware component.

In some embodiments, determining discoverability of each hardware component in the hardware map is in response to a startup event. In further embodiments, the startup event is a return to operation after a sleep mode, a return to operation after a soft start, or a return to operation after a full reset. In other embodiments, the computing system is controlled via a BMC and creating the hardware map, determining discoverability of the hardware components of the computing system and initiating a reset of the hardware component that is not discoverable are controlled by the BMC. In other embodiments, creation of the hardware map is triggered by a system administrator, in response to addition of a hardware component to the computing system, and/or in response to removal of a hardware component to the computing system.

A program product for automatic systems devices rediscovery includes a non-volatile computer readable storage medium storing code. The code is configured to be executable by a processor to perform operations that include creating a hardware map of hardware components of a computing system at a time when each of the hardware components of the computing system is discoverable, determining discoverability of each hardware component in the hardware map at a point in time after creation of the hardware map, and in response to determining that a hardware component listed in the hardware map is not discoverable, initiating a reset of the hardware component.

In some embodiments, the code is further configured to be executable by the processor to perform operations that include determining if the hardware component is discoverable after the reset, initiating a normal operating mode in response to determining that the hardware component is discoverable, and sending an alert to a system administrator in response to determining that the hardware component is not discoverable.

FIG. 1 is a schematic block diagram illustrating a system 100 for automatic systems devices rediscovery, according to various embodiments. The system 100 includes a discovery apparatus 102 and a hardware map 103 in a management controller 104 of a computing system 106. The management controller 104 is connected to a management server 110 over a management network 108 and to a variety of devices over various buses.

The discovery apparatus 102 is configured to create a hardware map 103 of hardware components of the computing system 106 at a time when each of the hardware components of the computing system 106 is discoverable. This hardware map 103 is intended to be a map of all hardware components in a working condition that are discoverable, for example, during startup. The discovery apparatus 102 is configured to determine discoverability of each hardware component in the hardware map 103 at a point in time after creation of the hardware map 103. Where a hardware component listed in the hardware map 103 is not discoverable, the discovery apparatus 102 initiates a reset of the hardware component.

The discovery apparatus 102, in some embodiments, then determines if the hardware component is discoverable after reset. If the hardware component is discoverable after reset, the discovery apparatus 102 initiates a normal operating mode. If the hardware component is still not discoverable, the discovery apparatus 102 takes other actions, such as resetting an upstream device or possibly a full reset. Beneficially, the discovery apparatus 102 is able to automatically detect devices that are not discoverable and reset the devices without the typical manual discovery and reset in current use.

As used herein a reset command sent by the discovery apparatus 102 to a hardware component is a command intended to reset, restart, recondition, etc. the hardware component so that the hardware component is discoverable. In the embodiments described herein, a reset command sent by the discovery apparatus 102 to a hardware component after determining that the hardware component is not discoverable is intended to reset, reboot, restart, etc. the hardware component without a hard reset or reboot of the computing system 106. In some embodiments, the discovery apparatus 102 uses presence bits to determine discovery and to establish confidence that a hardware component is discoverable. In the embodiments, during discovery the discovery apparatus 102 reads information regarding discovery of a component and determines a status of a presence bit for the component. Where the presence bit indicates that the component is discoverable, the discovery apparatus 102 marks the component as discoverable. One of skill in the art will recognize other ways for the discovery apparatus 102 to make use of presence bits during discovery.

The discovery apparatus 102, in various embodiments, is also able to send some form of a general reset to reset all hardware components of the computing system 106 after first attempting a reset of a hardware component that is not discoverable. A general reset may be in the form of disconnecting and reconnecting AC or DC power cycle to the computing system 106, a virtual AC power cycle that resets the hardware components of the computing system 106 without actually turning AC power off then on, or the like.

As used herein, the discovery apparatus 102 discovering a hardware component includes any form of communication with the hardware component to identify a status of the hardware component. As used herein, a hardware component that is discoverable by the discovery apparatus 102 includes communicating with the hardware component and determining that the hardware component is functioning normally. As used herein, a hardware component that is not discoverable is a hardware component that does not respond to the discovery apparatus 102, responds with an error message, responds with an unexpected communication, or other communication indicative of the hardware component not functioning, and/or not functioning properly. In some embodiments, a hardware component that is discoverable includes a hardware component that is functioning at a level such that the hardware component is able to self-report any errors or problems present with the hardware component to a system administrator, user, etc. while a hardware component that is not discoverable includes a hardware component not capable of self-reporting a problem to a system administrator, user, etc. The discovery apparatus 102 is described in more detail in relation to the apparatuses 200, 300 of FIGS. 2 and 3.

The hardware components in the hardware map 103 include any hardware components that are discoverable during a startup operation. In some embodiments, the hardware components include processors 112, memory 114 (such as dual inline memory modules ("DIMM")), graphical processing units ("GPUs") 116, solid-state drives ("SSDs") 118 (such as form factor M.2), power supply units ("PSUs") 120, fans 122, a network interface card ("NIC") 124, a redundant array of independent disks ("RAID") adapter 126, a backplane 128, storage devices 130, a field programmable gate array ("FPGA") 132, input/output ("I/O") devices 134, such as a keyboard, mouse, trackball, etc. or other device available in a computing system 106. Note that in some instances, multiple hardware components of the same type are depicted. For example, n processors are depicted 112a-112n. As used herein, the n processors 112a-112n may be referred to singly, generically, or collectively as a processor 112 or processors 112. The same terminology is used for other hardware components (e.g. 114, 116, 118, 120, 122, 126, 128, 130, 132, 134) of the computing system 106.

The computing system 106, in some embodiments, is a computing device within a structure, such as a computer case. In some embodiments, the hardware components discoverable by the management controller 104 are within the structure. In other embodiments, some hardware components of the hardware map 103 are inside a structure that includes the processors 112, memory 114, etc. while some hardware components discoverable by the management controller 104 are external to the structure. For example, the RAID adapter 126, backplane 128, and/or storage devices 130 may be located externally but are discoverable by the management controller 104. In various examples, the computing system 106 is a server, a desktop computer, a workstation, a personal computer, a laptop computer, a tablet computer, a mainframe computer, a supercomputer, or other computing device that has discoverable hardware components.

The management controller 104, in some embodiments, is a baseboard management controller ("BMC"). Some examples of a management controller 104 include a Lenovo® XClarity® Controller ("XCC"). In some embodiments, the management controller 104 is a management engine ("ME"). The management controller 104 is a device that is connected to a management network 108 and is accessible through a management server 110. In some embodiments, the management controller 104 is connected to a management network 108 separate from a computer network used by virtual machines ("VMs"), containers, and servers for communications, workloads, etc. The management controller 104 typically has access to various components of the computing system 106 and are able to control the hardware components, report alerts and other data from the hardware components and manage the hardware components. In some embodiments, a management controller 104 is able to access hardware components of the computing system 106 when the computing system 106 is not running and is often able to reboot the computing system 106.

In some embodiments, the management controller 104 includes or has access to firmware used for discovery and control of the hardware components of the computing system 106. The firmware, in some embodiments, is compliant with a unified extensible firmware interface ("UEFI") specification, with an extensible firmware interface ("EFI") specification, a basic input/output interface ("BIOS"), or the like. In some examples, the management controller 104 is not connected to a management network 108. For example, the management controller 104 may be part of a user computing system 106, such as a desktop computer, a laptop computer, or the like. Often user computing systems 100 not connected to a management network 108 have a communication capability accessible for loading, managing, configuring, etc. firmware of the computing system 106. As used herein, the management controller 104 is a BMC, BIOS, UEFI device, etc. that has a capability to discover, manage, and/or reset hardware components of the computing system 106.

The management network 108, in some embodiments, is a backchannel network different from a computer network (not shown) used for servicing workloads, executing applications, etc. on the processors 112 of the computing system 106. The management network 108, in various embodiments, may include a LAN, a WAN, a fiber optic network, a wireless connection, a public network (such as the Internet), or the like. The management network 108, in some embodiments, uses a management protocol such as Redfish, Intelligent Platform Management Interface ("IPMI"), Simple Network Management Protocol ("SNMP"), Alert Standard Format ("ASF"), or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM" ®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

In some embodiments, the computing systems 106 are servers or other devices in a datacenter. In some embodiments, devices other than the computing system 106 shown in FIG. 1 include a management controller 104. For example, a storage device external to servers may include a management controller 104. In some embodiments, the management controller 104 of the computing system 106, storage devices, etc. are connected to a management server 110 that acts as a gateway for external communications. The management server 110, in some embodiments, is a Lenovo XClarity Administrator ("LXCA"). In other embodiments, the management server 110 is located remotely from the computing system 106 and may be a server of an owner where the computing system 106 is a server of a plurality of servers at a customer location managed through the management network 108. In such embodiments, the management server 110 may be a Lenovo XClarity Orchestrator ("LXCO"), or a similar server.

In some embodiments, the management network 108 is a secure network. In some embodiments, a management server 110 acting as a gateway to an external network is accessible over a private and/or secure connection. In some embodiments, a system administrator is able to access the management server 110 via virtual private network ("VPN") over a public computer network, such as the Internet. In other embodiments, the secure connection between the management server 110 and other devices, such as an owner server, is implemented using another secure communications protocol. In embodiments described herein, an owner server is able to communicate with the management server 110 and/or management controllers 104 and is able to manage computing systems 106.

The system 100 of FIG. 1 depicts a computing system 106 with n processors 112. In some embodiments, a processor 112 is a central processing unit ("CPU"). In various embodiments, the computing system 106 includes a single processor 112 or more than one processor 112. In some embodiments, a processor 112 may include one or more cores. In some embodiments, a processor 112 may include a hypervisor that manages access to cores of the processor 112. The discovery apparatus 102, in some embodiments, is able to communicate with the processors 112 and is able to individually reset one or more processors 112 if not discoverable. One of skill in the art will recognize other forms of a processor 112 for a computing system 106 with a discovery apparatus 102.

The computing system 106 includes memory 114, which often is in the form of a DIMM, but may be in other forms. For example, the memory 114 may be in the form of various levels of cache for the processors 112. The discovery apparatus 102, in some embodiments, is able to discover one or more of the memory devices 114 and is able to initiate a reset command to a memory device 114 when not discoverable.

The computing system 106 includes one or more GPUs 116. The GPUs 116 are capable of processing graphic commands associated with displaying information on an electronic device, among other capabilities. In some embodiments, a GPU 116 is connected to an electronic display. In other embodiments, the one or more GPUs 116 process graphics commands for a remote electronic display. The discovery apparatus 102, in some embodiments, is capable of discovering the one or more GPUs 116 of the computing system 106 and is able to send a reset command if a GPU 116 is not discoverable.

The computing system 106 includes, in some embodiments, SSDs 118. In some embodiment, the SSDs 118 are non-volatile memory in a solid-state form. The SSDs 118 may be flash memory, or other technology such as dynamic random access memory ("DRAM"), 3D XPoint™, phase-change memory ("PCM"), or the like. The SSDs 118 may be various form factors, such as in a traditional hard disk drive form or other form factors, such as mini-serial AT attachment ("mSATA"), M.2, U.2, and the like. In various embodiments, the discovery apparatus 102 is able to discover one or more of the SSDs 118 and is able to send a reset command to an SSD 118 that is not discoverable.

In some embodiments, the computing system 106 includes one or more power supply units ("PSUs") 120 and/or one or more fans 122. Often a computing system 106 includes a single PSU 120, and some computing systems 106 include multiple PSUs 120 for capacity and/or redundancy. The computing system 106 typically includes at least one fan 122 but may include multiple fans 122. In some embodiments, the PSUs 120 include one or more fans 122 and the computing system 106 includes other fans 122. The computing system 106, in some embodiments, includes redundant fans 122. The discovery apparatus 102, in some embodiments, is able to discover one or more of the PSUs 120 and/or one or more of the fans 122 and is able to send a reset command to a PSU 120 and/or fan 122 that is not discoverable.

The computing system 106 includes a network interface card ("NIC") 124 or similar device that is an interface between the hardware components of the computing system 106 and a computer network. In some embodiments, the computing system 106 includes multiple NICs 124. In some embodiments, a NIC 124 is used by the management controller 104 for connection to the management network 108. In the embodiments, the NIC 124 may include a port used by the management controller 104 for connection to the management network 108. In other embodiments, the management controller 104 is connected to the management network 108 through a dedicated port. The discovery apparatus 102, in some embodiments, is able to discover the NIC 124 and is able to send a reset command to the NIC 124 when not discoverable.

In some embodiments, the computing system 106 includes a RAID adapter 126 connected to two or more storage devices 130. In some embodiments, the RAID adapter 126 is connected to the storage devices 130 through a backplane 128. In other embodiments, the computing system 106 includes one or more storage devices 130 and does not include a RAID adapter 126 and/or a backplane 128. For example, a server of a data center may include a computing system 106 with a RAID adapter 126 and backplane 128 connected to storage devices 130 while a desktop computer, laptop computer, etc. of a user may include a single storage device 130 or a plurality of storage devices 130 without a RAID adapter 126 and/or a backplane 128.

The storage devices 130 may come in various forms, such as a hard disk drive ("HDD"), an optical drive, or the like. In some embodiments, the RAID adapter 126, backplane 128, and/or storage devices 130 are internal to a structure, case, etc. of the computing system 106. In other embodiments, the RAID adapter 126, backplane 128, and/or one or more of the storage devices 130 are external to a structure, case, etc. of the computing system 106. The discovery apparatus 102, in some embodiments, is able to discover the RAID adapter 126, backplane 128, and/or storage devices 130 and is able to send a reset command to one or more of the RAID adapter 126, backplane 128, and/or storage devices 130 when not discoverable.

In some embodiments, the computing system 106 includes one or more FPGAs 132. FPGA 132, in some embodiments, execute workloads sent to the computing system 106. For example, an FPGA 132 may be used to off-load work from the processors 112. The discovery apparatus 102, in some embodiments, is able to discover the FPGA 132 and is able to send a reset command to the FPGA 132 when not discoverable.

In some embodiments, the computing system 106 includes a connection to I/O devices 134, such as a keyboard, a mouse, a trackball, a trackpad, a camera, or the like. Often, I/O devices 134 are plug-and-play devices that may be connected and disconnected from the computing system 106 at will. In some embodiments, the discovery apparatus 102 is able to discover I/O devices 134 at startup and map the I/O devices 134 in the hardware map 103 and is then able to send a reset command to an I/O device 134 that is not discoverable.

Each of the hardware components of the computing system 106 are connected to the management controller 104 directly or indirectly over one or more buses. The buses are of various protocols, such as Peripheral Component Interconnect Express ("PCIe"), Power Management Bus ("PMBus®"), Inter-Integrated Circuit ("I2C" or "I²C"), Universal Serial Bus ("USB"), Serial Peripheral Interface ("SPI"), Platform Environment Control Interface ("PECI"), General Purpose Input/Output ("GPIO"), and the like. The discovery apparatus 102 communicates with each hardware component of the computing system 106 using an appropriate bus or pathway. In some embodiments, the discovery apparatus 102 communicates with a controller of a hardware component for discovery and control. One of skill in the art will recognize other ways for the discovery apparatus 102 to communicate with, control, manage, reset, etc. a hardware component.

Figure 2:
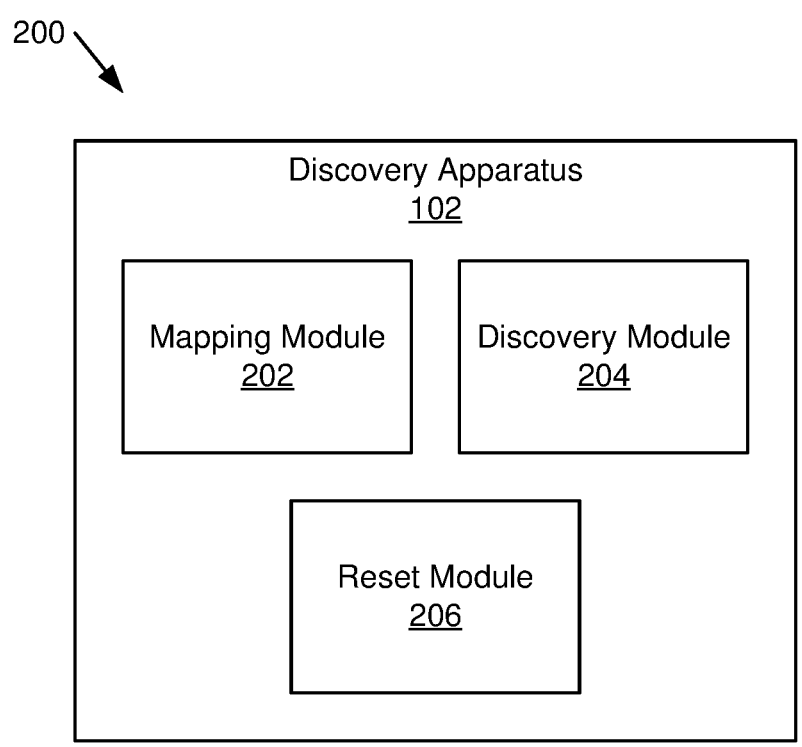
FIG. 2 is a schematic block diagram illustrating an apparatus for automatic systems devices rediscovery, according to various embodiments.

FIG. 2 is a schematic block diagram illustrating an apparatus 200 for automatic systems devices rediscovery, according to various embodiments. The apparatus 200 includes a discovery apparatus 102, according to various embodiments, with a mapping module 202, a discovery module 204 and a reset module 206, which are described below. In some embodiments, all or a portion of the apparatus 200 is implemented with executable code stored on computer readable storage media. In other embodiments, all or a portion of the apparatus 200 is implemented using a programmable hardware device and/or hardware circuits.

The apparatus 200 includes a mapping module 202 configured to create a hardware map 103 of hardware components of a computing system 106 at a time when each of the hardware components of the computing system 106 is discoverable. In some embodiments, the time when each of the hardware components of the computing system 106 is discoverable is a known good operating point. The known good operating point, in some embodiments, is at the end of a testing period. For example, the testing period may be at the end of manufacturing of the computing device. In other examples, the testing period may be at a user or customer location. In some embodiments, the known good point is after installation of one or more hardware components. In other embodiments, the known good point is after removal of one or more hardware components.

In some embodiments, the mapping module 202 receives input from a system administrator, user, or other person confirming that a list of discovered hardware components of the computing system 106 is correct. In other embodiments, the mapping module 202 determines that a list of discovered hardware components is valid for use in creating the hardware map 103 based on test results, the end of a testing period, or other trigger. One of skill in the art will recognize other ways for the mapping module 202 to determine a particular point in time to create a hardware map 103 when each of the hardware components of the computing system 106 are discoverable.

In some embodiments, the mapping module 202 initiates a discovery process to identify hardware components of the computing system 106 that are discoverable. In other embodiments, the mapping module 202 determines which hardware components of the computing system 106 are discoverable from another discovery service. For example, a discovery service may run after an AC cycle, at startup, or other point in time and the mapping module 202 uses results from the discovery service to create the hardware map 103. Where the discovery service initiates discovery of the hardware components of the computing system 106 at a point in time deemed by the mapping module 202 to correspond to a known good operating point, the mapping module 202 uses the results of the discovery service to create the hardware map 103.

The apparatus 200, in some embodiments, includes a discovery module 204 configured to determine discoverability of each hardware component in the hardware map 103 at a point in time after creation of the hardware map 103. In some examples, the discovery module 204 determines discoverability of each hardware component in the hardware map 103 at a startup event. The startup event, in various embodiments, is a soft reboot, resumption of operations after a sleep mode, after a full reset, after a virtual AC cycle, after an AC cycle, or other similar operation. In some examples, the discovery module 204 determines discovery at a time prior to normal operations, before executing workloads, or another convention time.

In some embodiments, the discovery module 204 determines discoverability of each hardware component in the hardware map 103 during a normal operating mode. In some examples, a discovery operation may disrupt operations and the discovery module 204 initiates a pause in operations or similar command before the discovery. In other embodiments, discovery does not affect normal operations and the discovery module 204 determines discoverability during normal operations. In some embodiments, the discovery module 204 initiates discovery of the hardware components. In other embodiments, the discovery module 204 accesses results from a discovery service. In the embodiments, the discovery module 204 may launch the discovery service.

In some embodiments, the discovery module 204 compares hardware components discovered during a discovery operation with hardware components in the hardware map 103 to determine discoverability of each hardware component in the hardware map 103. The discovery module 204, in some embodiments, flags, publishes, etc. hardware components of the computing system 106 that are not discoverable.

The apparatus 200 includes a reset module 206 configured to, in response to determining that a hardware component listed in the hardware map 103 is not discoverable, initiate a reset of the hardware component. Initiating a reset of the hardware component, in various embodiments, is an attempt to change the status of the hardware component to a functional state where the hardware component is discoverable. The reset module 206 initiating a reset, in some embodiments, includes issuing a reset command. In other embodiments, the reset module 206 initiating a reset of the hardware component includes attempting to establish a communication link between the management controller 104 and the hardware component. In other embodiments, the reset module 206 initiating a reset of the hardware component includes cycling power to the hardware component. In other embodiments, the reset module 206 initiating a reset includes multiple actions. One of skill in the art will recognize other ways for the reset module 206 to initiate a reset of the hardware component.

Figure 3:
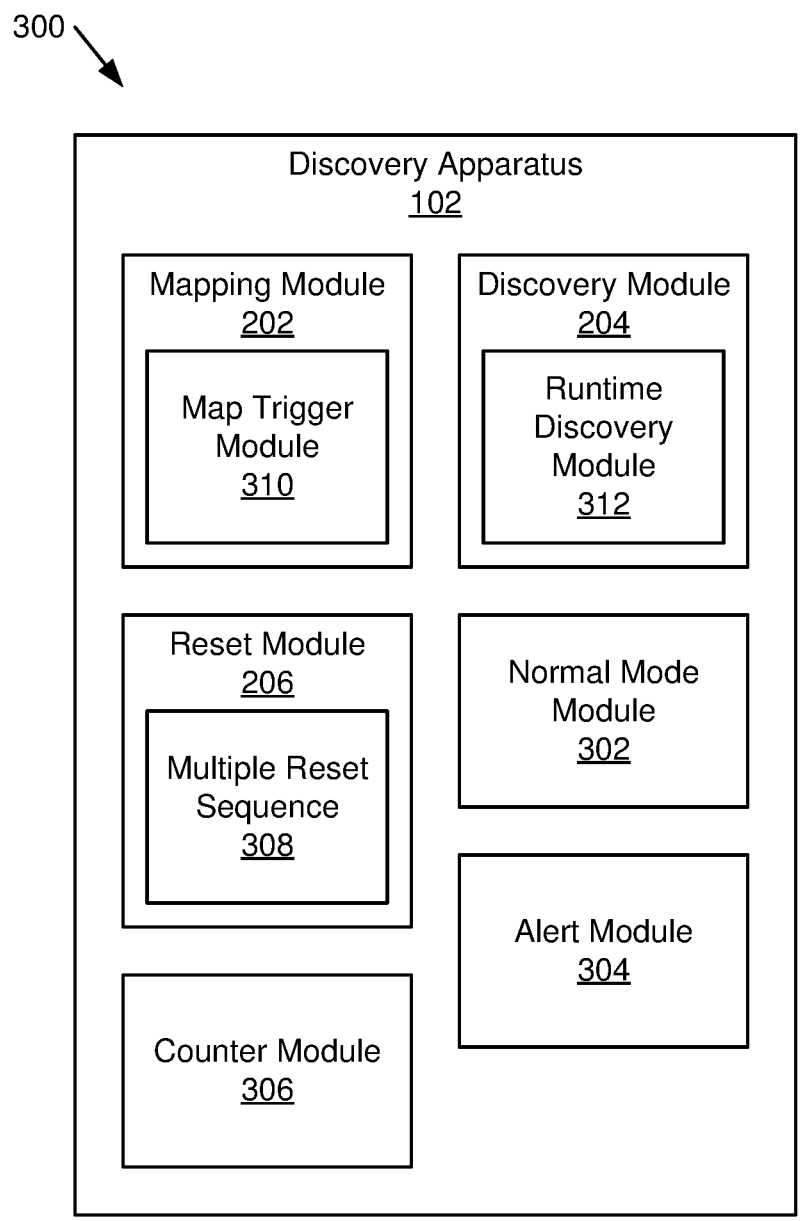
FIG. 3 is a schematic block diagram illustrating another apparatus for automatic systems devices rediscovery, according to various embodiments.

FIG. 3 is a schematic block diagram illustrating another apparatus 300 for automatic systems devices rediscovery, according to various embodiments. The apparatus 300 includes a discovery apparatus 102 according to various embodiments with a mapping module 202, a discovery module 204, and a reset module 206 which are substantially similar to those described in relation to the apparatus 200 of FIG. 2. The apparatus 300, in various embodiments, includes a normal mode module 302, an alert module 304, a counter module 306, a multiple reset sequence 308 in the reset module 206, a map trigger module 310 in the mapping module 202, and/or a runtime discovery module 312 in the discovery module 204, which are described below. In some embodiments, all or a portion of the apparatus 300 is implemented with executable code stored on computer readable storage media. In other embodiments, all or a portion of the apparatus 300 is implemented using a programmable hardware device and/or hardware circuits.

In some embodiments, the discovery module 204 again determines if the hardware component is discoverable after the reset module 206 initiates a reset and the apparatus 300 includes a normal mode module 302 configured to initiate a normal operating mode in response to the discovery module 204 determining that the hardware component is discoverable and an alert module 304 configured to send an alert to a system administrator in response to determining that the hardware component is not discoverable. In some embodiments, the discovery module 204 determines if the hardware component is discoverable after each time the reset module 206 initiates a reset of the hardware component.

The normal mode module 302, in response to the discovery module 204 determining that the hardware component is discoverable, is configured to initiate a normal operating mode. The normal operating mode, in some embodiments, includes the discovery apparatus 102 taking no further actions until another startup event or other trigger point to initiate discovery. In other embodiments, the discovery apparatus 102 pauses startup operations for discovery and the normal mode module 302 resumes startup and the computing system 106 operates in a normal operating mode after completion of startup operations. In other embodiments, the normal mode module 302 communicates with the computing system 106, management controller 104, etc. to indicate normal operations may commence or resume. One of skill in the art will recognize other ways for the normal mode module 302 to initiate a normal operating mode for the computing system 106.

The alert module 304, in response to the discovery module 204 determining that the hardware component is not discoverable after the reset module 206 initiates a reset, sends an alert. In some embodiments, the alert is sent to a system administrator. In other embodiments, the alert is sent to a user. In other embodiments, the alert is an electronic message, such as an email or a text message. In other embodiments, the alert is a signal, such as an interrupt, a sequence of bits, etc. that triggers an action, such as setting a flag, interrupting an application, triggering an alarm, and the like.

In some embodiments, the discovery module 204 repeats determining discoverability of the hardware component after a reset and the reset module 206 repeats initiating a reset of the hardware component in response to the discovery module 204 again determining that the hardware component is not discoverable. In the embodiments, the apparatus 300 includes a counter module 306 configured to increment a reset counter each time the hardware component is determined to be not discoverable after a reset and the alert module 304 sends an alert in response to the reset counter reaching a reset threshold. For example, the reset threshold may be set to three and after the reset counter reaches three then the alert module 304 sends an alert. In other embodiments, the alert module 304 sends an alert in response to the reset counter exceeding the reset threshold. Beneficially, using a reset counter allows a reasonable number of attempts to reset the hardware component before sending an alert.

The reset module 206, in some embodiments, includes a multiple reset sequence 308. In some embodiments, when the reset module 206 initiates a reset of the hardware component of the computing system 106, the reset module 206 initiates a multiple reset sequence 308. The multiple reset sequence 308, in some embodiments, includes initiating a reset of one or more upstream hardware components located upstream of the hardware component that is not discoverable. For example, the discovery module 204 may determine that the storage device 1 130a is not discoverable and the reset module 206 may send a reset command to storage device 1 130a. The discovery module 204 may determine that storage device 1 130a is still not discoverable. The reset module 206 may then send a reset command to the backplane 128 feeding storage device 1 130a and the discovery module 204 then determines again if storage device 1 130a is discoverable.

In other embodiments, the reset module 206 sends a reset command (e.g. initiates a reset) to the upstream hardware component and to the hardware component that is not discoverable. In some embodiments, the reset module 206 sends a reset command on two or more upstream hardware components. For example, the reset module 206 may send a reset command to the RAID adapter 126 in response to storage device 1 130a not being discoverable after the reset module 206 sends a reset command to the backplane 128 and/or to the storage device 1 130a and storage device 1 130a is still not discoverable.

In some embodiments, the multiple reset sequence 308 includes initiating a reset of the computing system 106. The multiple reset sequence 308 includes initiating a reset of the computing system 106 after first resetting the hardware component and/or an upstream hardware component. Resetting the computing system is typically a last resort. For example, the reset module 206 may initiate a reset of the computing system 106 after one or more rounds of initiating resets and the discovery module 204 still finding that the hardware component is not discoverable. Note that as contemplated herein, embodiments include at least one round of the hardware component not being discoverable, the reset module 206 initiating a reset, and the discovery module 204 still determining that the hardware component is not discoverable before the reset module initiates a reset of the computing system 106. In response to the reset module 206 executing the multiple reset sequence 308 and the discovery module 204 determining that the hardware component is not discoverable, the alert module 304 sends an alert.

In some embodiments, the counter module 306 includes a single reset threshold and the counter module 306 increases a reset counter for each time the discovery module 204 determines that the hardware component is not discoverable as the reset module 206 executes the multiple reset sequence 308. For example, the counter module 306 may increase the reset counter after the discovery module 204 determines that the hardware component is not discoverable while the reset module 206 sends a reset command to the hardware component, after the reset module 206 sends a reset command to an upstream component, after the reset module 206 initiates a reset of the computing system 106, etc.

In other embodiments, the counter module 306 includes a reset threshold and/or a reset counter for multiple levels (e.g. for the hardware component, for a first upstream hardware component, for a second hardware component, etc.) and the reset module 206 uses the multiple reset sequence 308 and reset counters exceeding thresholds to move to another level of reset. For example, the reset module 206 may continue to send reset commands to the hardware component until the counter module 306 determines that the reset counter for the hardware component exceeds a hardware component reset threshold before the reset module 206 sends a reset to an upstream device. The reset module 206 may then use a separate reset threshold and/or reset counter while sending reset commands to the upstream device. One of skill in the art will recognize how the reset module 206 with a multiple reset sequence 308, the alert module 304, and/or the counter module 306 work together to send multiple reset commands to the same or different hardware components according to a multiple reset sequence 308.

The apparatus 300, in some embodiments, includes a map trigger module 310 in the mapping module 202 configured to trigger the mapping module 202 to create a hardware map in response to a trigger event indicating a known good operating point. In some embodiments, the map trigger module 310 triggers the mapping module 202 to create the hardware map based on user input indicating that the hardware components of the computing system 106 are discoverable, operating properly, etc. In other embodiments, the map trigger module 310 triggers the mapping module 202 to create the hardware map in response to test results indicating that hardware components are working and discoverable. In other embodiments, the map trigger module 310 triggers the mapping module 202 to create the hardware map based on completion of assembly, testing, and the like at a manufacturer. In other embodiments, the map trigger module 310 triggers the mapping module 202 to create the hardware map after installation or removal of one or more hardware components. One of skill in the art will recognize other ways for the map trigger module 310 to trigger the mapping module 202 to create the hardware map.

The apparatus 300, in some embodiments, includes a runtime discovery module 312 in the discovery module 204 configured to cause the discovery module 204 to determine discoverability of each hardware component in the hardware map during a normal operating mode. In some embodiments, the runtime discovery module 312 interrupts one or more processes, operations, applications, etc. during a normal operating mode before triggering the discovery module 204 to determine discoverability of the hardware components and then restarts the interrupted processes, operations, etc. after discovery and any necessary reset commands. In some examples, the reset module 206 initiating reset of a hardware component, an upstream component, and/or a full reset is in response to the runtime discovery module 312 preparing operation of the computing system 106 for a reset.

In other embodiments, the discovery module 204 determining discovery of the hardware components does not affect normal operation and the runtime discovery module 312 triggers the discovery module 204 to determine discoverability of the hardware components based on expiration of a timer, based on a schedule, based on an event, or other trigger during normal operating mode. One of skill in the art will recognize other ways for the runtime discovery module 312 to trigger the discovery module 204 to determine discoverability of the hardware components and to manage the discovery during a normal operating mode.

Figure 4:
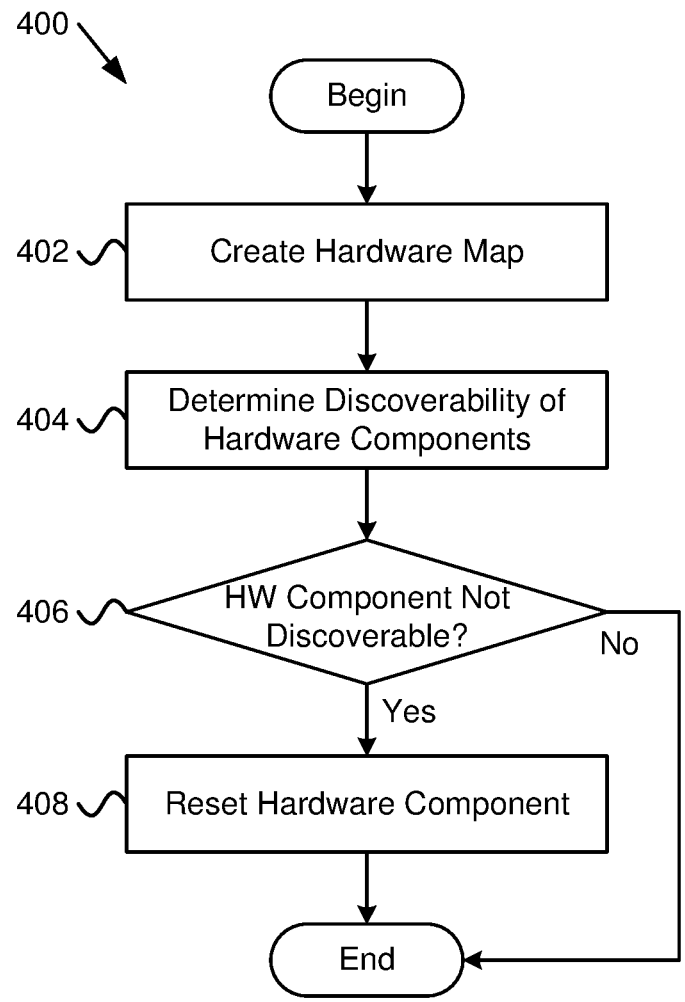
FIG. 4 is a schematic flow chart diagram illustrating a method for automatic systems devices rediscovery, according to various embodiments.

FIG. 4 is a schematic flow chart diagram illustrating a method 400 for automatic systems devices rediscovery, according to various embodiments. The method 400 begins and creates 402 a hardware map of hardware components of a computing system 106 at a time when each of the hardware components of the computing system 106 is discoverable. In some examples, the method 400 creates 402 the hardware map at a known good operating point when hardware components of the computing system 106 desired to be running are discoverable.

The method 400 determines 404 discoverability of each hardware component in the hardware map at a point in time after creation of the hardware map. In some examples, the method 400 determines 404 discoverability at a wakeup from a sleep mode or other startup-type event. The method 400 determines 406 if there is a hardware component of the computing system 106 that is not discoverable. If the method 400 determines 406 that there are no hardware components that are not discoverable, the method 400 ends. If the method 400 determines 406 that a hardware component of the computing system 106 is not discoverable, the method 400 initiates 408 a reset of the hardware component that is not discoverable, and the method 400 ends. In various embodiments, all or a portion of the method 400 is implemented using the mapping module 202, the discovery module 204, and/or the reset module 206.

Figure 5:
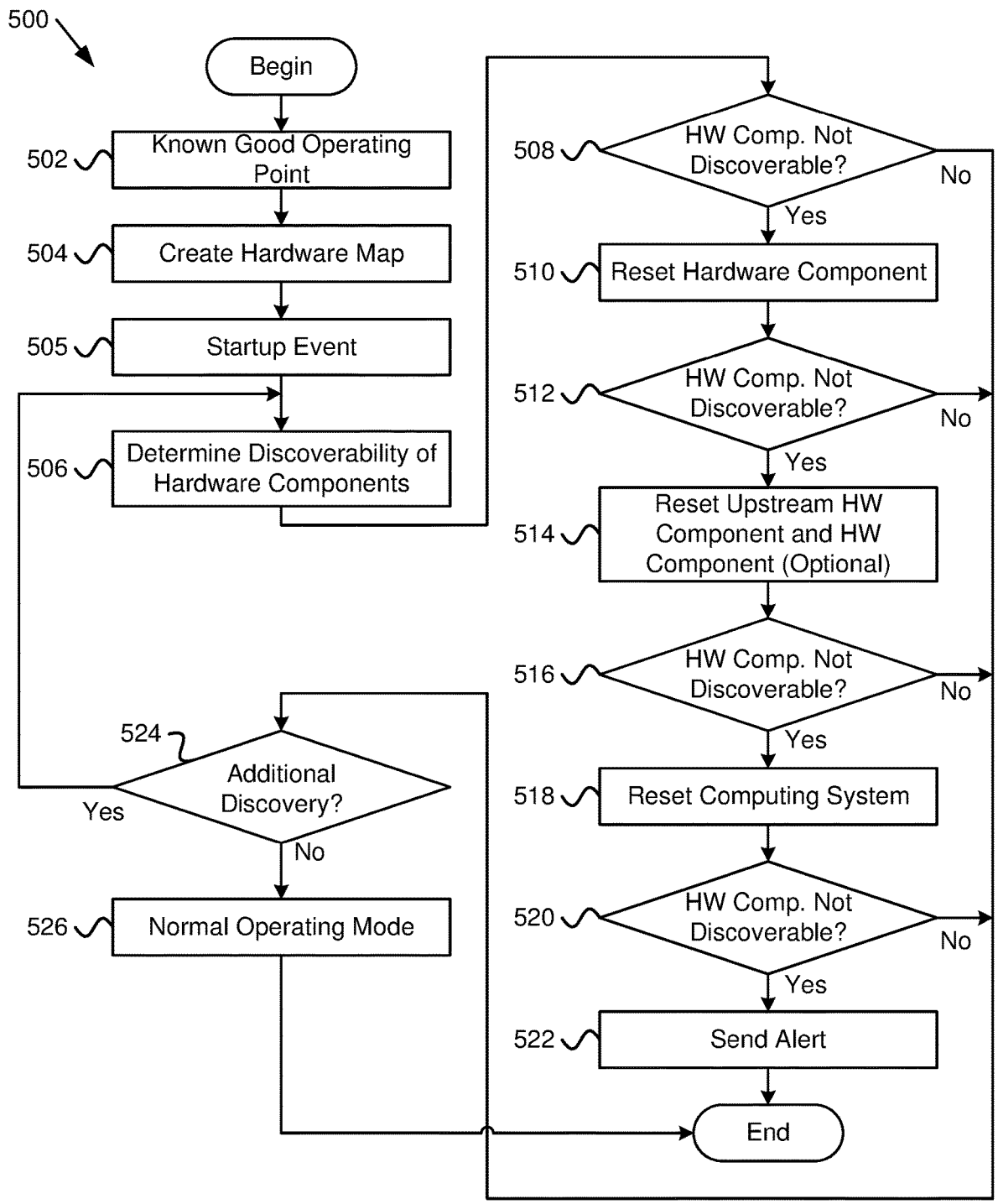
FIG. 5 is a schematic flow chart diagram illustrating another method for automatic systems devices rediscovery, according to various embodiments.

FIG. 5 is a schematic flow chart diagram illustrating another method 500 for automatic systems devices rediscovery, according to various embodiments. The method 500 begins and at a known good operating point 502 creates 504 a hardware map of hardware components of a computing system 106 at a time when each of the hardware components of the computing system 106 is discoverable. At a startup event 505, the method 500 determines 506 discoverability of each hardware component in the hardware map at a point in time after creation of the hardware map. The startup event includes, in various embodiments, a wakeup after a sleep mode, a full reset, an AC power cycle, or the like. The method 500 determines 508 if a particular hardware component of the computing system 106 is not discoverable. If the method 500 determines that the hardware component is not discoverable, the method 500 initiates 510 a reset of the hardware component that is not discoverable and the method 500 again determines 512 if the hardware component is not discoverable.

If the method 500 determines 512 that the hardware component is still not discoverable, the method 500 initiates 514 a reset of an upstream component (if any) and optionally also again initiates 514 a reset of the hardware component and again determines 516 if the hardware component is discoverable. If the method 500 determines 516 that the hardware component is still not discoverable, the method 500 resets the computing system 106 and again determines 520 if the hardware component is discoverable. If the method 500 determines 520 that the hardware component is still not discoverable, the method 500 sends 522 an alert, and the method 500 ends. The alert may be to a system administrator, other user, etc.

If the method 500 determines 508 after first determining 506 discoverability of the hardware component or after determining 512, 516, 520 discoverability of the hardware component after a reset 510, 514, 518 that the hardware component is discoverable, the method 500 determines 524 if there is another hardware component to be checked for discoverability. If the method 500 determines 524 that there are no additional hardware components to be checked for discoverability, the method 500 initiates 526 a normal operating mode, and the method 500 ends. If the method 500 determines 524 that there is an additional hardware component of the computing system 106 to be checked for discoverability, the method returns and determines 506 discoverability of the hardware component.

The method 500 of FIG. 5 is merely one possible way to determine discoverability of hardware components of a computing system 106. In other embodiments, a reset timer may be used at each reset step or overall where an alert is sent if the timer reaches a reset threshold. In other embodiments, each hardware component has a unique reset strategy where some hardware components do not have an upstream hardware component to be reset if resetting the hardware component does not work, other hardware components have one or more upstream hardware components to be reset sequentially when the hardware component is not discoverable after a reset. Other embodiments may include a full reset of the computing system 106 after one or more hardware components are reset and a hardware component is still not discoverable. Other embodiments may include no full reset. One of skill in the art will recognize other reset strategies that may be performed before a full reset and/or before sending an alert. In various embodiments, all or a portion of the method 500 is implemented using the mapping module 202, the discovery module 204, the reset module 206, the normal mode module 302, the alert module 304, the counter module 306, the multiple reset sequence 308, the map trigger module 310, and/or the runtime discovery module 312.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    creating a hardware map of hardware components of a computing system at a time when each of the hardware components of the computing system is discoverable;
    determining discoverability of each hardware component in the hardware map at a point in time after creation of the hardware map;
    in response to determining that a hardware component listed in the hardware map is not discoverable, initiating a reset of the hardware component;
    determining if the hardware component is discoverable after the reset;
    initiating a normal operating mode in response to determining that the hardware component is discoverable after the reset;
    repeating resetting the hardware component in response to determining that the hardware component is not discoverable;
    incrementing a reset counter each time the hardware component is determined to be not discoverable in response to resetting the hardware component; and
    sending an alert to a system administrator in response to the reset counter reaching a reset threshold.

2. The method of claim 1, further comprising:
    initiating a reset of an upstream hardware component located upstream of the hardware component that is not discoverable after the reset of the hardware component that is not discoverable and prior to sending the alert; and
    determining if the hardware component is discoverable in response to the reset of the upstream hardware component,
    wherein the alert is sent in response to determining that the hardware component is not discoverable after the reset of the upstream hardware component.

3. The method of claim 1, wherein determining discoverability of each hardware component in the hardware map is in response to a startup event.

4. The method of claim 3, wherein the startup event is one of a return to operation after a sleep mode, a return to operation after a soft start, or a return to operation after a full reset.

5. The method of claim 1, wherein determining discoverability of each hardware component in the hardware map occurs during a normal operating mode.

6. The method of claim 5, wherein initiating the reset of the hardware component, upstream hardware components, and/or a full reset is in response to preparing operation of the computing system for a reset.

7. The method of claim 1, wherein the computing system is controlled via a baseboard management controller ("BMC"), and wherein creating the hardware map, determining discoverability of the hardware components of the computing system and initiating the reset of the hardware component that is not discoverable are controlled by the BMC.

8. The method of claim 1, wherein creation of the hardware map is triggered:
    by a system administrator;
    in response to addition of a hardware component to the computing system; and/or
    in response to removal of a hardware component to the computing system.

9. An apparatus comprising:
    a processor; and
    a non-volatile memory storing code, the code being executable by the processor to perform operations comprising:
        creating a hardware map of hardware components of a computing system at a time when each of the hardware components of the computing system is discoverable;
        determining discoverability of each hardware component in the hardware map at a point in time after creation of the hardware map;
        in response to determining that a hardware component listed in the hardware map is not discoverable, initiating a reset of the hardware component;
        determining if the hardware component is discoverable after the reset;
        initiating a normal operating mode in response to determining that the hardware component is discoverable after the reset;
        repeating resetting the hardware component in response to determining that the hardware component is not discoverable;
        incrementing a reset counter each time the hardware component is determined to be not discoverable in response to resetting the hardware component; and
        sending an alert to a system administrator in response to the reset counter reaching a reset threshold.

10. The apparatus of claim 9, wherein the operations further comprise:
    initiating a reset of an upstream hardware component located upstream of the hardware component that is not discoverable after the reset of the hardware component that is not discoverable and prior to sending the alert; and
    determining if the hardware component is discoverable in response to the reset of the upstream hardware component,
    wherein the alert is sent in response to determining that the hardware component is not discoverable after the reset of the upstream hardware component.

11. The apparatus of claim 9, wherein determining discoverability of each hardware component in the hardware map is in response to a startup event.

12. The apparatus of claim 11, wherein the startup event is one of a return to operation after a sleep mode, a return to operation after a soft start, or a return to operation after a full reset.

13. The apparatus of claim 9, wherein the computing system is controlled via a baseboard management controller ("BMC"), and wherein creating the hardware map, determining discoverability of the hardware components of the computing system and initiating the reset of the hardware component that is not discoverable are controlled by the BMC.

14. The apparatus of claim 9, wherein creation of the hardware map is triggered:
- by a system administrator;
- in response to addition of a hardware component to the computing system; and/or
- in response to removal of a hardware component to the computing system.

15. A program product comprising a non-volatile computer readable storage medium storing code, the code being configured to be executable by a processor to perform operations comprising:
- creating a hardware map of hardware components of a computing system at a time when each of the hardware components of the computing system is discoverable;
- determining discoverability of each hardware component in the hardware map at a point in time after creation of the hardware map;
- in response to determining that a hardware component listed in the hardware map is not discoverable, initiating a reset of the hardware component;
- determining if the hardware component is discoverable after the reset;
- initiating a normal operating mode in response to determining that the hardware component is discoverable after the reset;
- repeating resetting the hardware component in response to determining that the hardware component is not discoverable;
- incrementing a reset counter each time the hardware component is determined to be not discoverable in response to resetting the hardware component; and
- sending an alert to a system administrator in response to the reset counter reaching a reset threshold.

* * * * *